United States Patent [19]
Kennedy

[11] 3,949,394
[45] Apr. 6, 1976

[54] READ AMPLIFIER HAVING RETRIGGERABLE, VARIABLE DUTY CYCLE INHIBIT PULSE GENERATOR

[75] Inventor: Charles J. Kennedy, Pasadena, Calif.

[73] Assignee: C. J. Kennedy Company, Altadena, Calif.

[22] Filed: Apr. 8, 1974

[21] Appl. No.: 458,895

[52] U.S. Cl. ....... 340/347 DD; 235/61.11 D; 360/42
[51] Int. Cl.² ....................... H03K 5/00; G11B 5/09
[58] Field of Search ............. 235/61.11 D, 61.11 E; 340/146.3 Z; 360/42

[56] References Cited
UNITED STATES PATENTS

| | | | |
|---|---|---|---|
| 3,622,758 | 11/1971 | Schanne........................ | 235/61.11 E |
| 3,727,202 | 4/1973 | Fort................................... | 360/42 |
| 3,737,632 | 6/1973 | Barnes.......................... | 235/61.11 E |
| 3,805,175 | 4/1974 | Nassimbene.................. | 325/38 B X |
| 3,806,706 | 4/1974 | Hasslinger et al............ | 235/61.11 E |

*Primary Examiner*—Thomas J. Sloyan
*Attorney, Agent, or Firm*—Robert H. Fraser; Raymond A. Bogucki

[57] ABSTRACT

A read amplifier generates pulses in response to the transitions of a phase encoded signal and selectively gates the pulses to an output and to a retriggerable one shot multivibrator under the control of inhibit pulses produced by the multivibrator. During a preamble of the data signal in which a known sequence of zeros is produced, a decade counter prevents generation of pulses in response to the polarity return transitions between the zeros and prevents the inhibit pulses from being applied to gate the pulses produced by the data signal until a predetermined number of zero pulses has been counted. During the preamble the inhibit pulses at the output of the multivibrator are averaged and compared with a reference so as to adjust the duty cycle of the multivibrator to produce inhibit pulses which are 70 percent of the duration of the bit intervals of the data signal. Thereafter, the system is self-adjusting with the multivibrator responding to each pulse at the beginning of a bit interval to begin generation of an inhibit pulse and the averaging circuit being operative to adjust the multivibrator duty cycle as the bit intervals change so as to maintain the duration of the inhibit pulses at a selected ratio of the length of the bit intervals.

3 Claims, 16 Drawing Figures

READ AMPLIFIER HAVING RETRIGGERABLE, VARIABLE DUTY CYCLE INHIBIT PULSE GENERATOR

BACKGROUND OF THE INVENTION

1. Field of the Invention

The present invention relates to data detection systems, and more particularly to read amplifiers which sense separate valid data transitions of a data signal from other transitions of the signal.

2. History of the Prior Art

It is commonly known in data processing operations to transmit binary or digital data in the form of a signal having transitions between two different levels such that the transitions represent the data. Data signals of this type may, for example, comprise a magnetic recording in which transitions between opposite levels of magnetic saturation represent the data being transmitted. A number of encoding formats have been devised for carrying data in this fashion. One of the better known formats is so-called phase encoding in which the sense, polarity of direction of the transitions at particular time locations along the length of the data signal represent the information being carried.

In reading the data carried by data signals employing phase encoding and certain other types of encoding, it is generally necessary to both detect the transitions and their sense and determine the location of the transitions relative to a time scale. For example in the case of phase encoding the data signal is arbitrarily divided into a succession of bit intervals. The senses of transitions at the beginnings or leading edges of the bit intervals denote the data. However, further transitions appear in the region of the centers of various ones of the bit intervals since the polarity of the signal must reverse where the immediately following data transition is to have the same sense as the preceding transition. Accordingly it is necessary to provide the read amplifier with timing circuitry for defining the bit intervals so that it can be determined whether a sensed transition represents a data signal or merely a polarity reversal in the signal.

A number of techniques are commonly employed for providing a time reference in connection with a data signal having a succession of transitions. One of the more common techniques involves the use of a phase locked oscillator. The oscillator is locked to the data signal to define the various bit intervals or other time reference. However, a number of disadvantages commonly arise from conventional arrangements of this type. For one thing phase locked oscillating arrangements tend to be relatively complex. Moreover, such arrangements do not lock onto the data signal to the extent required for acceptable accuracy in many applications. Typically such arrangements do not respond to every leading edge transition but only to selected transitions. As a result the oscillator provides a uniform signal defining a succession of uniform bit intervals. As a practical matter, however, data signals tend to be non-uniform. For one thing such signals can vary significantly from one bit interval to the next, leading to errors where a phase locked oscillator arrangement is used. In those arrangements where the bit intervals are arbitrarily defined based on given conditions at the beginning of operation, further errors can occur, for example, simply due to variations in the speed of the medium carrying the data signal relative to the transducer.

BRIEF DESCRIPTION OF THE INVENTION

Read amplifiers according to the invention respond to each leading edge transition of the data signal in defining the bit intervals thereof. In this way operation of the read amplifier is made to depend on the actual behavior of the data signal rather than on some arbitrary standard. An inhibit pulse is generated in response to each indication of the leading edge of a bit interval to define a "window" comprising a fixed percentage or ratio of the length of the bit interval. This inhibit pulse which may, for example, be 70 percent of the length of a bit interval occurs immediately after detection of the leading edge of the bit interval and is employed to prevent transitions occurring during the central portion of the bit interval and which typically represent a change in polarity of the data signal rather than valid data from erroneously producing a corresponding data signal at the output. The inhibit pulse terminates far enough in advance of the leading edge of the immediately following bit interval to allow for the detection of the corresponding data carrying transition. The inhibit pulses are averaged together with the time intervals between inhibit pulses so as to maintain the length of the inhibit pulses at a fixed percentage of the average length of a bit interval, despite changes which may occur in the bit interval.

In a preferred embodiment of a read amplifier according to the invention a pair of pulse generators are coupled to respond respectively to positive-going and negative-going transitions of an incoming data signal by generating a pulse in response to each transition. During the preamble of the data signal in which a succession of zeros occurs, the pulses at the output of one of the pulse generators and which correspond to the zeros are counted by a decade counter which prevents the other pulse generator from generating pulses in response to transitions of the data signal until a predetermined count is reached by the counter signifying the end of the preamble. At the same time inhibit pulses produced by a retriggerable one-shot multivibrator are prevented by the decade counter from being applied to a pair of gates at the outputs of the pulse generators until the predetermined count is reached at the end of the preamble. The gates at the outputs of the pulse generators which are noramlly coupled to be controlled by the inhibit pulses are coupled so as to pass pulses gated thereby to an output via a flip flop and to the retriggerable one-shot multivibrator. Each pulse generated in response to a transition at the leading edge of a bit interval is passed to the multivibrator where it causes an inhibit pulse to be generated. An averaging circuit coupled to the output of the multivibrator compares the durations of the inhibit pulses to the time periods between the inhibit pulses by averaging the multivibrator output signal and comparing the result with a reference value. The averaging circuit changes the duty cycle of the multivibrator as necessary to maintain the durations of the inhibit pulses a fixed percentage of the lengths of the bit intervals.

During the preamble the decade counter disables one of the pulse generators to prevent 1 pulses from being generated and prevents the gates from being inhibited by the inhibit pulses. As a consequence the 0 pulses from the preamble are passed to the multivibrator to produce corresponding inhibit pulses. The preamble enables the multivibrator and accompanying averaging circuit to adjust to the bit intervals so that the pulses are of desired length with respect to the bit intervals at the end of the preamble.

Upon termination of the preamble the decade counter removes the disabling signal from the pulse generator and couples the inhibit pulses to the gates. Thereafter each pulse corresponding to a transition at the leading edge of a bit cell is passed by one of the gates to the output as a valid data bit and to the multivibrator to initiate generation of an inhibit pulse. During the occurrence of the inhibit pulse during a substantial portion of the bit interval, the gates are prevented from passing pulses to the output or to the multivibrator. This action prevents pulses which occur from reversals in polarity of the data signal or from noise from passing to the output as representations of valid data signals. Upon termination of the inhibit pulse the gates are enabled to pass the next pulse corresponding to a transition at the leading edge of a bit interval to the output and to the multivibrator to initiate generation of another inhibit pulse. Because the system responds to pulses actually generated in coincidence with the transitions at the leading edges of the bit intervals, the system locks surely and positively to the incoming data signal and responds to changes in the data signal virtually on a bit by bit basis.

BRIEF DESCRIPTION OF THE DRAWINGS

The foregoing and other objects, features and advantages of the invention will be apparent from the following more particular description of a preferred embodiment of the invention, as illustrated in the accompanying drawing, in which.

DETAILED DESCRIPTION

Figure 1:
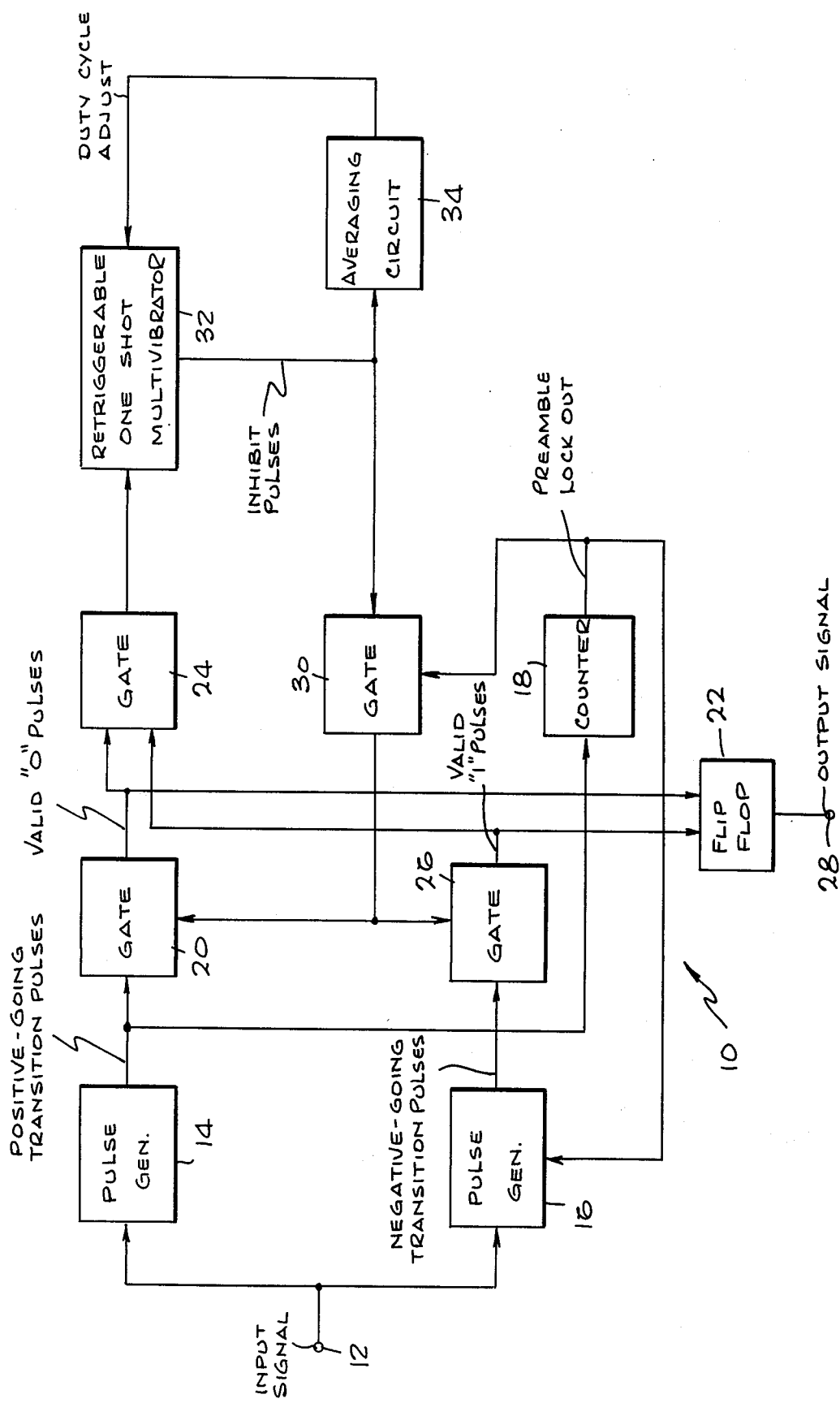
FIG. 1 is a block diagram of a read amplifier according to the invention.

FIG. 1 illustrates a read amplifier 10 according to the invention as having an input terminal 12 for receiving an input signal to be decoded or read. The input signal may be provided by any appropriate means such as a magnetic tape, disk or drum, with the exact means being unimportant to the invention. The input terminal 12 is coupled to a pair of pulse generators 14 and 16 which produce pulses in response to positive-going and negative-going transitions of the input signal respectively. The pulses at the output of the pulse generator 14 are applied directly to a counter 18 and via a gate 20 to a flip flop 22 and a gate 24. Pulses at the output of the pulse generator 16 are applied via a gate 26 to the flip flop 22 and to the gate 24. The output of the flip flop 22 is coupled to an output terminal 28 to provide an output signal denoting the binary data read from the input signal.

The counter 18 is coupled to control the pulse generator 16 and a gate 30 which controls the passage of inhibit pulses from a retriggerable one-shot multivibrator 32 to the gates 20 and 26. The multivibrator 32 which has its input coupled to the gate 24 also provides the inhibit pulses of the output thereof to an averaging circuit 34, the output of which is coupled to control the duty cycle of the multivibrator 32.

In operation, the pulse generators 14 and 16 produce pulses in response to the positive-going and negative-going transitions of the input signal. During the preamble of the input data signal 0 pulses produced by the pulse generator 14 are counted by the counter 18 until a predetermined count is reached signifying the end of the preamble. Prior to the predetermined count being reached, the counter 18 applies a lock out signal to prevent the pulse generator 16 from generating pulses in response to negative-going transitions of the input signal and to prevent the gate 30 from passing inhibit pulses from the multivibrator 32 to the gates 20 and 26. The 0 pulses at the output of the pulse generator 14 are accordingly passed by the gate 20 and the gate 24 to the multivibrator 32. Each pulse initiates the generation of an inhibit pulse. The averaging circuit 34 compares the durations of the inhibit pulses with the time spaces between inhibit pulses and adjusts the duty cycle of the multivibrator as necessary so that the lengths of the inhibit pulses bear a selected relationship or ratio with respect to the bit intervals as defined by the incoming pulses.

When the preamble ends as determined by the counter 18 the pulse generator 16 is restored to normal operation and the gate 30 is actuated so as to couple the inhibit pulses to the gates 20 and 26. Thereafter the gates 20 and 26 control passage of the pulses from the generators 14 and 16 to the flip flop 22 and to the multivibrator 32 under the control of the inhibit pulses from the multivibrator 32. At the beginning of each bit interval the transition of the input signal causes the pulse generator 14 or the generator 16 to produce a pulse which is gated by the gate 20 or 26 to the flip flop 22 and to the gate 24. The flip flop 22 responds by changing state to provide the desired output signal at the output terminal 28. The gate 24 which merely functions to combine the pulses from the gates 20 and 26 at the input of the multivibrator 32 passes the pulse to the multivibrator 32 to commence generation of an inhibit pulse. The resulting inhibit pulse is passed by the gate 30 to inhibit the gates 20 and 26 during a selected portion of the bit interval. If a transition or noise signal within the input signal occurs during this period, the resulting pulse from the generator 14 or 16 is blocked by the gate 20 and 26 respectively. Upon termination of the bit interval, the transition at the leading edge of the immediately following bit interval causes the pulse generator 14 or 16 to produce a pulse which is passed to the flip flop 22 and to the multivibrator 32. The flip flop 22 continues to produce the output signal, while the multivibrator 32 commences generation of another inhibit pulse which is applied to the gates 20 and 26 to prevent gating of a subsequent pulse during the selected portion of the bit interval that the inhibit pulse exists. The averaging circuit 34 continues to measure the length of the inhibit pulses relative to the bit intervals and to make changes in the duty cycle of the multivibrator 32 as required to maintain the desired ratio between inhibit pulse length and bit interval length.

Figure 2:
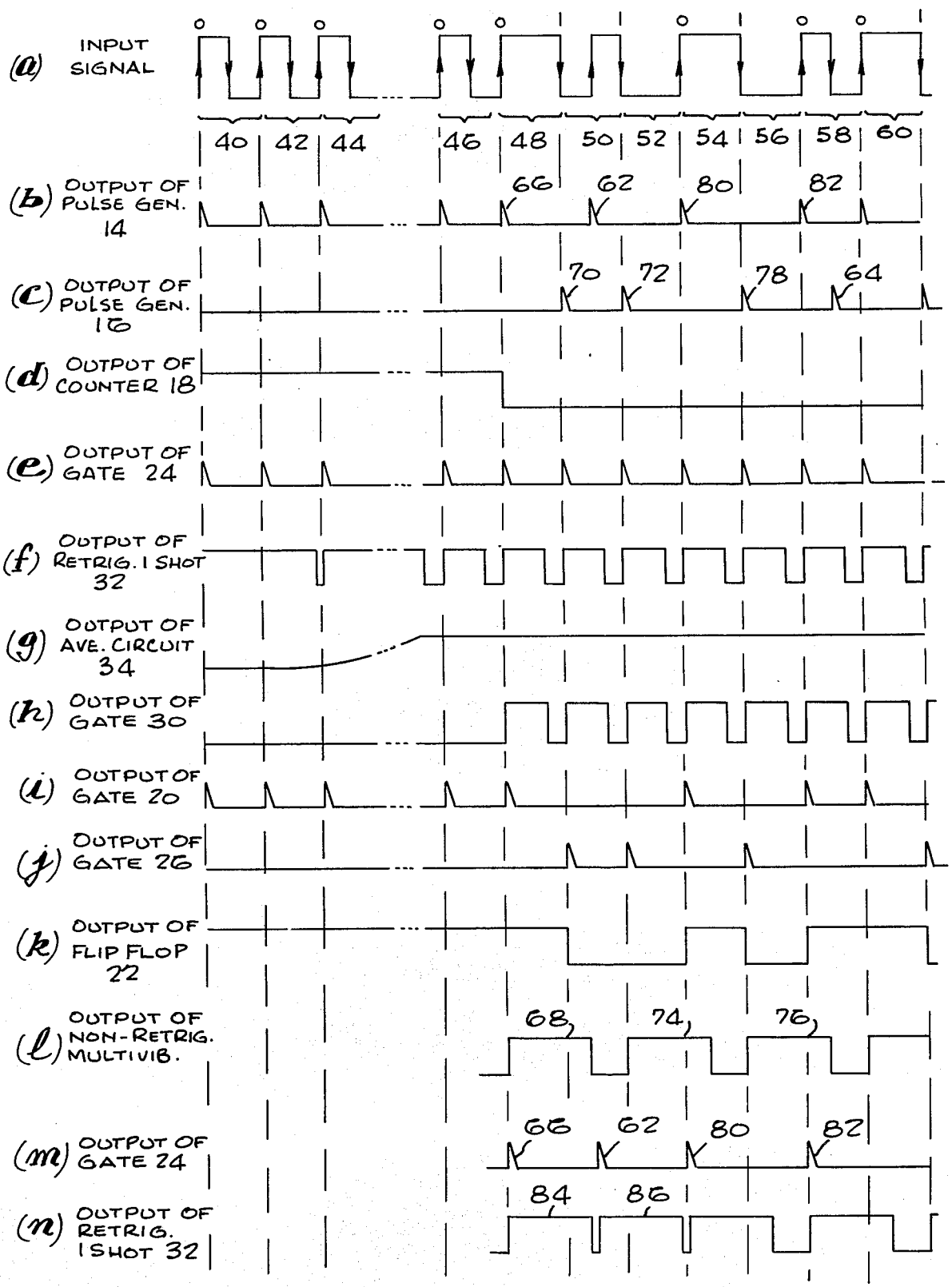
FIGS. 2a–2n are diagrammatic waveforms useful in explaining the operation of the read amplifier of FIG. 1.

FIG. 2a provides one example of an input signal which may be applied to the input terminal 12 of the read amplifier 10 of FIG. 1. The signal of FIG. 2a which is comprised of a succession of bit intervals 40, 42, 44, 46, 48, 50, 52, 54, 56, 58 and 60 is phase encoded such that the sense or polarity of the transitions of the signal at the leading edges of the bit intervals represent binary data. In the present example positive-going transitions represent 0 and negative-going transitions represent 1.

It will be noted that whenever the transitions at the leading edges of successive bit intervals are of like polarity, there is a transition at the approximate center of the first bit cell to effect the necessary polarity reversal of the signal.

Phase encoded signals of the type shown in FIG. 2a must be detected by a system which defines the bit intervals so as to separate the data transitions at the leading edges of the bit intervals from polarity reversal and noise transitions over the length of the bit intervals. The transition at the leading edges of the bit intervals must be evaluated in terms of polarity to determine whether the bits represented thereby are 0 or 1.

The outputs of the pulse generators 14 and 16 are shown in FIGS. 2b and 2c, respectively. It will be noted that each positive-going transition of the input signal of FIG. 2a results in a pulse at the output of the pulse generator 14. Conversely each negative-going transition of the input signal produces a pulse at the output of the pulse generator 16. The bit intervals 40, 42, 44 and 46 occur within the preamble of the input signal. The preamble which comprises a string of 0's of known length terminates at the end of the bit interval 46. In most instances the preamble comprises a succession of ten 0's, in which event the counter 18 comprises a decade counter. As the counter 18 is counting to the predetermined count of ten the output thereof is at one level as shown in FIG. 2d. At the end of the preamble the output of the counter 18 changes to a different level to terminate the preamble lockout.

The output of the gate 24 at the input of the multivibrator 32 is shown in FIG. 2e. During the preamble the pulses from the pulse generator 14 generated in response to the succession of 0's are passed by the gate 20 and by the gate 24 to the multivibrator 32. At the beginning of the preamble the inhibit pulses are relatively long and typically extend over the length of several bit intervals as shown in FIG. 2f. The output of the averaging circuit 34 is shown in FIG. 2g. The averaging circuit 34 averages the output signal from the multivibrator 32 shown in FIG. 2f and compares the result with a reference value. As shown in FIG. 2g the output of the averaging circuit 34 increases in response to inhibit pulses of very long length, thereby shortening the duty cycle of the multivibrator 32. By the time the last bit interval 46 of the preamble is reached, the output of the averaging circuit 34 has risen to a level sufficient to provide the multivibrator 32 with a desired duty cycle. In the present example the inhibit pulses are chosen to have a length approximately 70% of the length of the bit intervals. The averaging circuit 34 maintains this fixed percentage or ratio independent of the length of the bit intervals. Thus if the bit intervals should lengthen such as by way of a slowing down of a recording medium which carries the input signal relative to a fixed transducer, the inhibit pulses would tend to have a shorter length than desired. The averaging circuit 34 immediately senses the change in the ratio of the inhibit pulse length to the remaining portion of each bit interval so as to change the duty cycle of the multivibrator 32 until the inhibit pulse length comprises the desired percentage of the bit interval. Conversely, if the bit intervals shorten, the averaging circuit 34 responds to inhibit pulses of greater than desired length to change the duty cycle of the multivibrator 32 until the inhibit pulse length bears the desired ratio to the bit interval.

The inhibit pulses of desired length are on the order of 70% of the bit intervals as shown in FIG. 2f for the intervals 48 through 60 following the preamble. During the preamble the output of the counter 18 inhibits the gate 30, the output of which is shown in FIG. 2h. At the end of the preamble, however, the gate 30 is opened so as to pass the inhibit pulses to the gates 20 and 26 as shown in FIG. 2h. The resulting outputs of the gates 20 and 26 are shown in FIGS. 2a and 2j, respectively. During the preamble the inhibit pulses have no effect on the gate 20, and the 0 pulses from the pulse generator 14 are passed via the gate 24 to the multivibrator 32 and to the flip flop 22. As previously mentioned these pulses are applied to the multivibrator 32 to establish the desired duty cycle within the multivibrator 32 with the aid of the averaging circuit 34 prior to termination of the preamble. At the same time the pulses from the gate 20 are applied to the flip flop 22 causing the flip flop to remain in one of its two different states as shown in FIG. 2k. Thereafter the gates 20 and 26 alternately provide pulses which occur at the leading edges of the bit intervals as seen in FIGS. 2i and 2j. Pulses such as the pulse 62 of FIG. 2b and the pulse 64 of FIG. 2c which occur as a result of polarity reversals in the input signal and which therefore occur at the centers of the bit intervals 50 and 58 are blocked from the flip flop 22 and from the gate 24 as seen in FIGS. 2i and 2j. Pulses from the gate 20 cause the flip flop 22 to assume the first of its two stable states, while pulses from the gate 26 cause the flip flop 22 to assume the second of the stable states, as shown in FIG. 2k. Assumption of the first state by the flip flop 22 during a particular bit interval denotes binary 0 while assumption of the second state during the bit interval denotes binary 1.

It will be appreciated that the read amplifier of FIG. 1 closely and positively follows the input signal by actually responding to the leading edge of each bit interval of the input signal. The multivibrator 32, moreover, is automatically adjusted as necessary to maintain a desired ratio of inhibit pulse length to bit interval length, independent of the actual lengths of the bit intervals. As seen in FIGS. 2i and 2j the system is effective to pass only valid data pulses to the output and to the multivibrator to produce the inhibit pulses. The multivibrator 32 preferably is of the retriggerable type rather than of the non-retriggerable type. Non-retriggerable one-shot multivibrators are typically characterized by their inability to respond to further pulses, once pulsed, and by their inability to generate a new pulse very closely following the termination of a prior pulse. Retriggerable one-shot multivibrators, on the other hand, are characterized by the generation of a complete new pulse period in response to each new input pulse, regardless of prior pulsing status, and by their ability to commence generation of a new pulse substantially immediately following termination of a prior pulse. As a result of these characteristics it is possible for a non-retriggerable multivibrator to produce an error condition as shown in FIG. 2l without the remainder of the system being capable of detecting and correcting such error.

The example of FIG. 2l assumes that at the end of the last bit interval 46 of the preamble the multivibrator and associated averaging circuit have settled into a condition in which the inhibit pulses are 70 percent of the length of a pair of bit intervals rather than a single bit interval. In such situation the pulse 66 at the output of the pulse generator 14 at the beginning of the bit interval 48 as seen in FIG. 2b initiates generation of an inhibit pulse 68. Due to the presence of the inhibit pulse 68, the gate 26 cannot respond to pass the valid 1 pulse 70 shown in FIG. 2c to either the output or the multivibrator. The inhibit pulse 68 terminates at a point 40 percent through the length of the bit interval 50. Accordingly, the pulse 62 at the output of the pulse generator 14 as shown in FIG. 2b and which occurs very shortly thereafter is ineffective to start the generation of a new inhibit pulse even though it is applied to the multivibrator, because of the recovery time required by non-retriggerable multivibrators. Accordingly the multivibrator does not initiate a new inhibit pulse until the occurrence of the pulse 72 at the beginning of the bit interval 52 as shown in FIG. 2c. This results in the generation of an inhibit pulse 74 throughout the duration of the bit interval 52 and through 40 percent of the duration of the bit interval 54. Upon termination of the inhibit pulse 74, the bilevel output of the multivibrator drops to the lower of the two levels for the remainder of the bit interval 54, then rises to the higher level to commence a new inhibit pulse 76 at the beginning of the bit interval 56 in response to the pulse 78 shown in FIG. 2c. Upon termination of the inhibit pulse 76, the pulse 64 at the output of the pulse generator 16 is ineffective to initiate a new inhibit pulse, again because of the recovery time required by non-retriggerable multivibrators. As a consequence the situation can continue indefinitely with the multivibrator continuing to generate inhibit pulses which extend over 70 percent of successive pairs of bit intervals, producing a false bit interval reference and leading to errors in the output. In the example of FIG. 2l the erroneous inhibit pulses 68, 74 and 76 block valid data pulses 70, 80 and 82 from the flip flop 22.

FIG. 2m shows the output of the gate 24 when a retriggerable one-shot multivibrator is used, the resulting inhibit pulses as produced by the retriggerable multivibrator being shown in FIG. 2n. Again it is assumed that upon termination of the preamble the multivibrator 32 is adjusted so as to generate an erroneous inhibit pulse over 70 percent of the combined length of a pair of bit intervals. Accordingly the pulse 66 from the pulse generator 14 as passed by the gate 24 initiates the generation of an inhibit pulse 84 which extends over the bit interval 48 and through 40 percent of the bit interval 50 before terminating. However, because of the very quick recovery time of a retriggerable multivibrator, the pulse 62 at the center of the bit interval 50 and which is passed by the gate 24 initiates generation of a second inhibit pulse 86 as shown in FIG. 2n. The inhibit pulse 86 is approximately the same length as the pulse 84 so as to terminate just prior to the leading edge of the bit interval 54. Accordingly, each time a pulse occurs at the center of the second of two bit intervals, the resulting inhibit pulses produced are very close together as in the case of the pulses 84 and 86. The averaging circuit 34 responds to the extremely long length of the inhibit pulses relative to the space between inhibit pulses in such situations by substantially decreasing the duty cycle of the multivibrator 32. As a consequence the inhibit pulses are quickly shortened to the desired length corresponding to 70 percent of a single bit interval rather than a pair of bit intervals.

Figure 3:
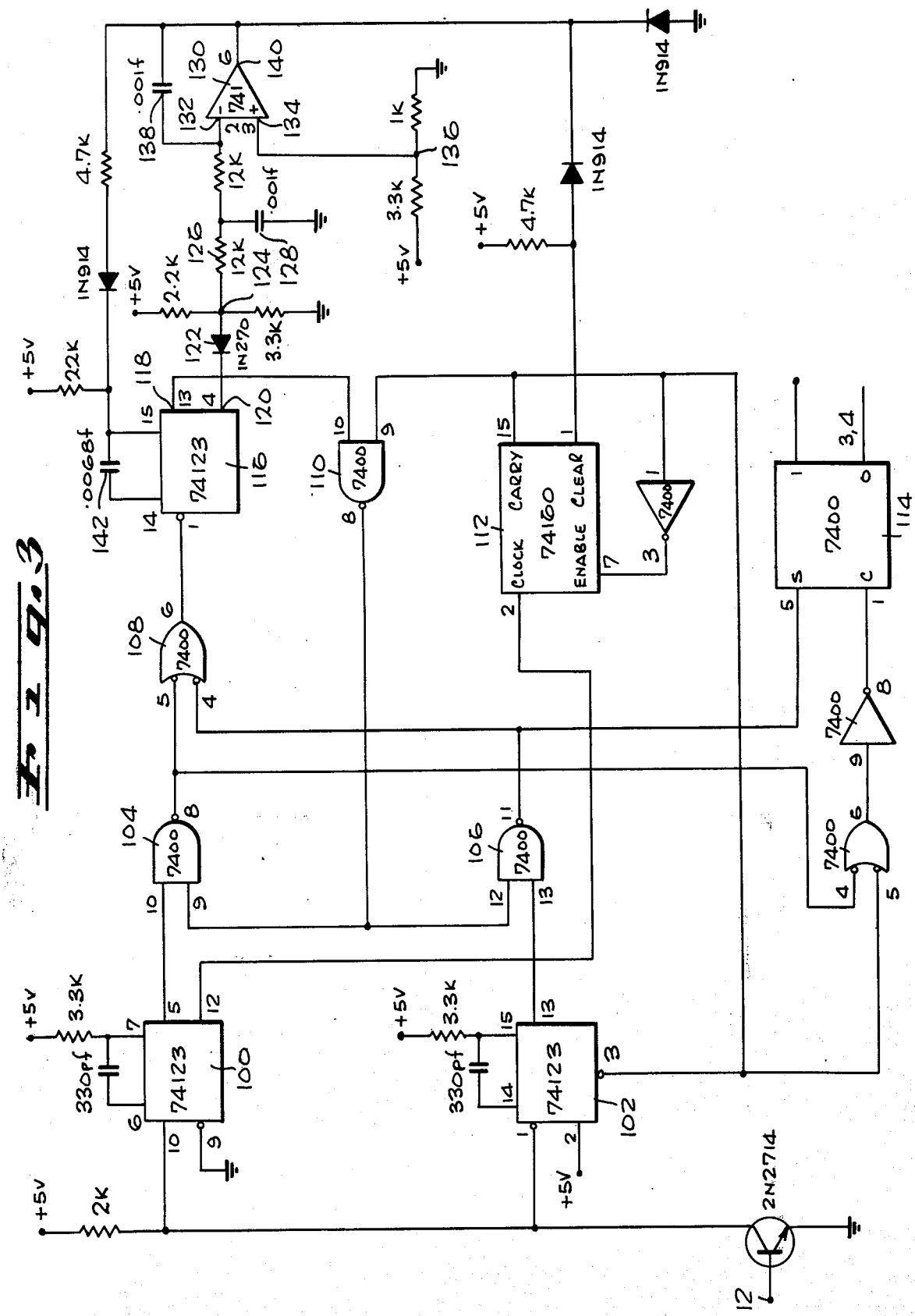
FIG. 3 is a schematic diagram of an actual circuit corresponding to the read amplifier of FIG. 1.

One preferred circuit for use as the read amplifier 10 of FIG. 1 is illustrated in detail in FIG. 3. In the circuit of FIG. 3 the pulse generators 14 and 16 respectively comprise integrated circuits 100 and 102 which are of the type sold under the numerical designation 74123 by Texas Instruments Corporation. The gates 20 and 26 respectively comprise integrated circuits 104 and 106 which are of the type sold under the numerical designations 7400 by Texas Instruments Corporation. The circuits 104 and 106 are coupled to operate as NAND gates in the example of FIG. 3. The gate 24 also comprises an integrated circuit 108 of the type sold under the numerical designation 7400, as does the gate 30 which comprises a circuit 110.

The counter 18 comprises an integrated counting circuit 112 of the type sold under the numerical designation 74160 by Texas Instruments Corporation. The "clock" terminal of the circuit 112 is coupled to receive the 0 pulses and the "carry" terminal is coupled to provide the preamble lockout to the gate 30 and the pulse generator 16. The flip flop 22 comprises an integrated circuit flip flop 114 of the type sold under the numerical designation 7400 by Texas Instruments Corporation. The "set" terminal of the circuit 114 is coupled to receive the 1 pulses from the circuit 106 comprising the gate 26, while the "clear" terminal of the circuit 114 is coupled to receive the 0 pulses from the circuit 104 comprising the gate 20.

The multivibrator 32 comprises an integrated circuit 116 of the type sold under the numerical designation 74123 by Texas Instruments Corporation. When the inhibit pulses produced at an output terminal 118 of the circuit 116 are too long relative to the lengths of the bit intervals, the inverted output signal at a terminal 120 of the circuit 116 is coupled via a diode 122, a network 124 and a resistor 126 to discharge a capacitor 128 within the averaging circuit 34. The averaging circuit 34 also includes an integrated circuit 130 of the type sold under the numerical designation 741 by Texas Instruments Corporation and coupled as an operational amplifier. The capacitor 128 is coupled to an input terminal 132 of the circuit 130 with the other input terminal 134 being coupled to a network 136 which provides a DC reference signal representing the desired ratio which the inhibit pulses are to assume with respect to the bit interval lengths. Discharging of the capacitor 128 causes the outpput of the circuit 130 to go positive, thereby charging a capacitor 138 coupled between the output terminal 140 and the input terminal 132 of the circuit 130. As the capacitor 138 charges a capacitor 142 also charges, changing the duty cycle of the circuit 116.

While the invention has been particularly shown and described with reference to a preferred embodiment thereof, it will be understood by those skilled in the art that various changes in form and details may be made therein without departing from the spirit and scope of the invention.

What is claimed is:

1. An arrangement for reading information carried by the transitions of a data signal comprising the combination of:

pulse generating means responsive to the data signal for generating a pulse in response to each transition of the data signal, the pulse generating means comprising a first pulse generator for generating a pulse in response to each transition of given polarity of the data signal and a second pulse generator for generating a pulse in response to each transition of polarity opposite said given polarity of the data signal;

output means;

gating means coupling the output means to the pulse generating means; and means coupled to the gating means for generating an inhibit pulse in response to each pulse provided thereto, the gating means inhibiting passage of pulses therethrough during the occurrence of each inhibit pulse, and passing pulses to the output means and to the inhibit pulse generating means whenever an inhibit pulse is not occurring;

said gating means comprising a pair of gates, each being coupled between one of the pulse generators, the inhibit pulse generating means and the output means; and the means for generating an inhibit pulse including a retriggerable one-shot multivibrator coupled to generate an inhibit pulse in response to each pulse and means for adjusting the width of the inhibit pulses in accordance with the rate of occurrence of the data signal including means coupled to the first pulse generator for counting pulses produced by the first pulse generator, means coupled to the second pulse generator and responsive to the counting means for preventing the second pulse generator from generating pulses until the counting means has counted a predetermined number of pulses, and means coupled between the inhibit pulse generating means and the pair of gates and responsive to the counting means for preventing the inhibit pulses from being applied to the pair of gates until the counting means has counted said predetermined number of pulses.

2. An arrangement for reading information carried by the transitions of a phase encoded data signal comprising the combination of:

a first pulse generator responsive to the data signal for generating a pulse in response to each transition of given sense of the data signal;

a second pulse generator responsive to the data signal for generating a pulse in response to each transition of sense opposite said given sense of the data signal;

a first gate coupled to the first pulse generator and operative to pass pulses from the first pulse generator to an output therof except when inhibited;

a second gate coupled to the second pulse generator and operative to pass pulses from the second pulse generator to an output thereof except when inhibited;

output means coupled to the outputs of the first and second gates;

a retriggerable single shot multivibrator coupled to the outputs of the first and second gates and operative to generate an inhibit pulse of predetermined duration in response to each pulse appearing at the outputs of the first and second gates;

means responsive to the phase encoded data signal for initially establising the duration of the inhibit pulses in accordance with the rate of occurrence of the phase encoded data signal;

means for averaging the durations of the inhibit pulses relative to the time periods between inhibit pulses to produce an actual average signal;

means providing a desired average signal;

means for comparing the actual and desired average signals;

means for adjusting the durations of the inhibit pulses in response to differences between the actual and desired average signals as determined by the means for comparing; and means coupling the inhibit pulses to inhibit the first and second gates;

said means for initially establishing the duration of the inhibit pulses including:

a third gate coupled between the retriggerable single shot multivibrator and the first and second gate, the third gate being operative to pass the inhibit pulses from the retriggerable single shot multivibrator to inhibit the first and second gates except when inhibited; and means coupled to the third gate and the second pulse generator and responsive to pulses produced by the first pulse generator to inhibit the third gate to prevent the second pulse generator for generating pulses until a predetermined number of pulses have been produced by the first pulse generator.

3. The invention defined in claim 2, wherein the means coupled to inhibit the third gate and prevent the second pulse generator from generating pulses includes a decade counter.

* * * * *

UNITED STATES PATENT OFFICE
CERTIFICATE OF CORRECTION

PATENT NO. : 3,949,394
DATED : April 6, 1976
INVENTOR(S) : Charles J. Kennedy

It is certified that error appears in the above—identified patent and that said Letters Patent are hereby corrected as shown below:

Column 2, line 48, "noramlly" should read --normally--.
Column 3, line 2, after "the" (second occurrence) and before "pulses" insert --inhibit--; line 34, "drawing" should read --drawings--. Column 8, line 43, "outpput" should read --output--. Column 10, line 13, "establising" should read --establishing--.

Signed and Sealed this twenty-second Day of June 1976

[SEAL]

Attest:

RUTH C. MASON
Attesting Officer

C. MARSHALL DANN
Commissioner of Patents and Trademarks